Patented Oct. 25, 1927.

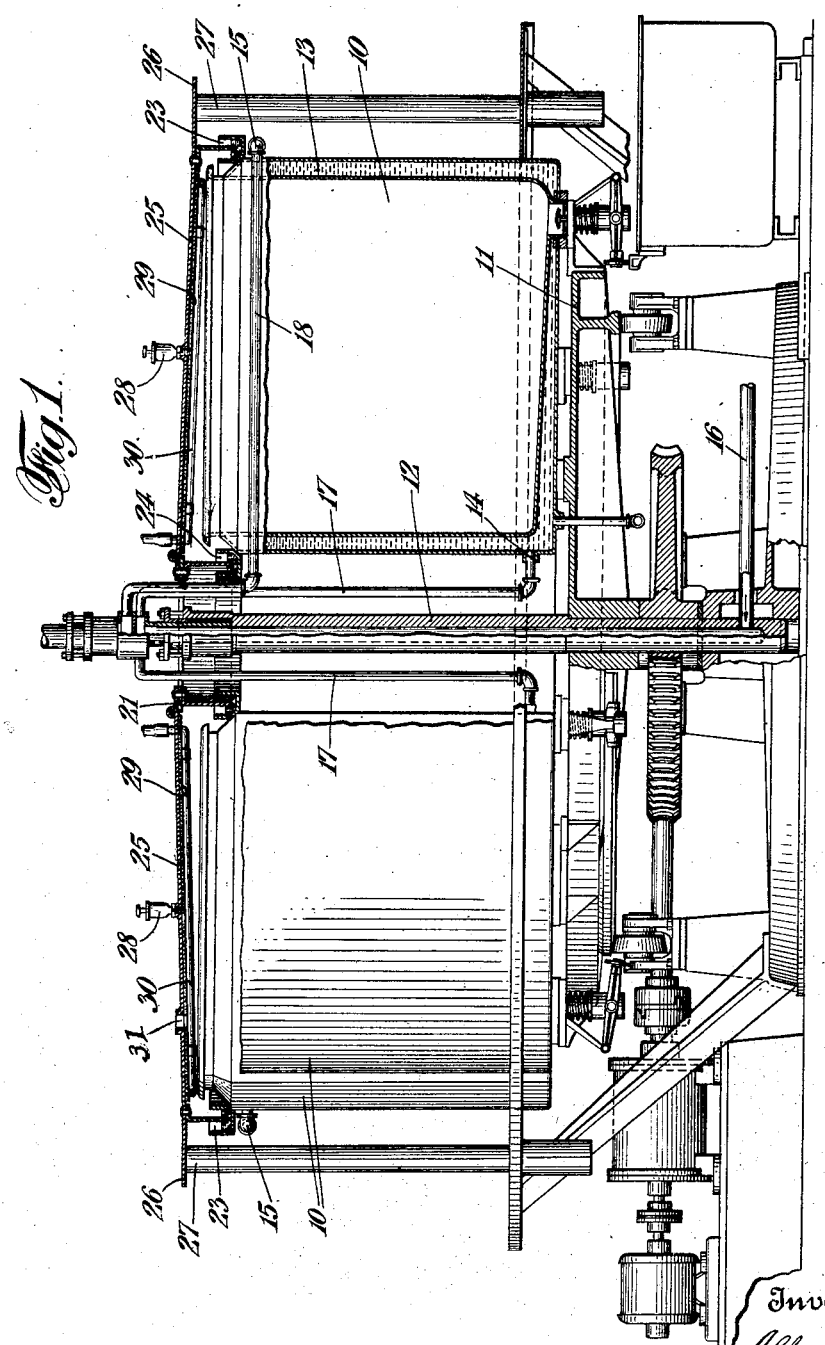

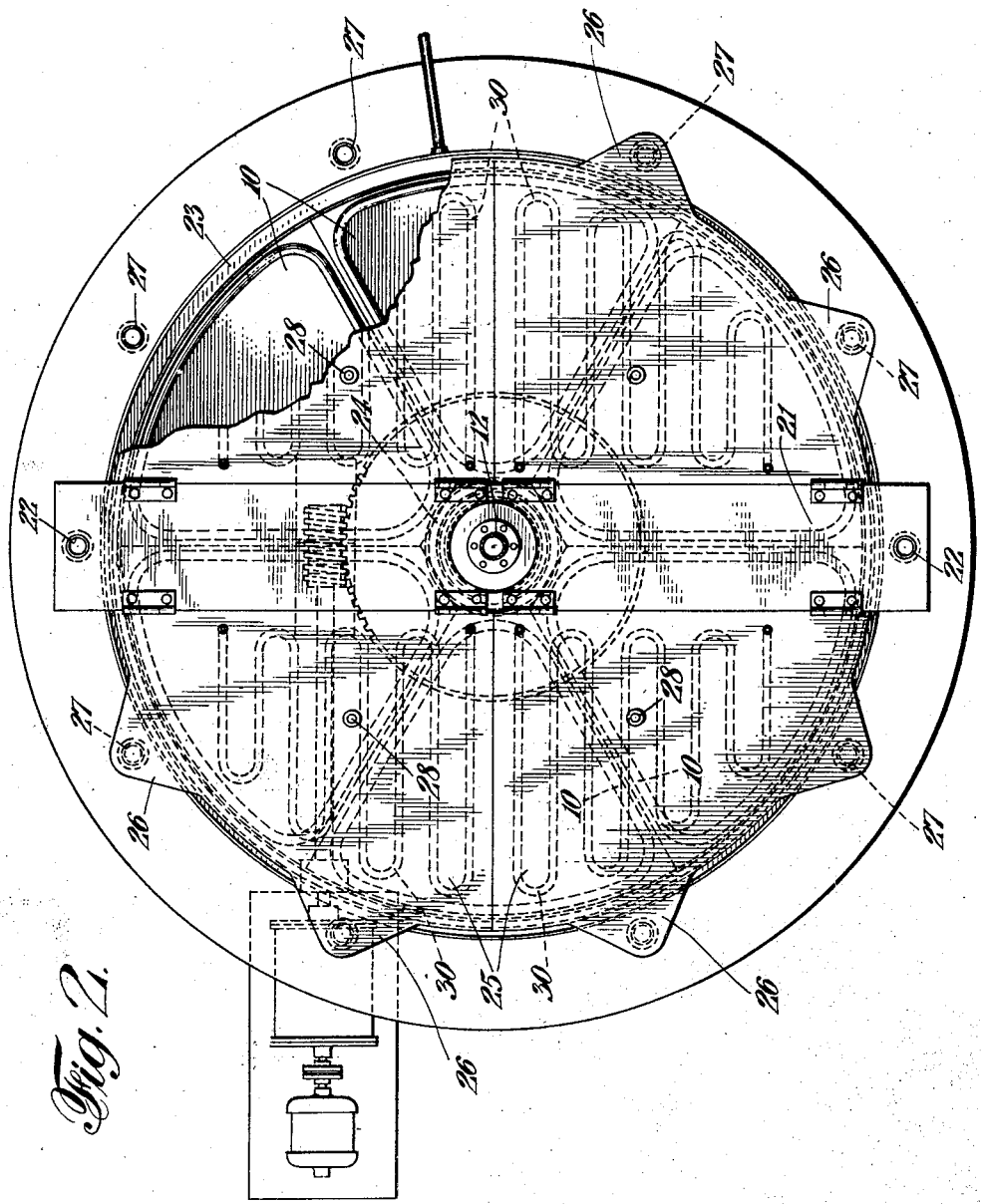

1,647,035

UNITED STATES PATENT OFFICE.

ALBERT J. DAVIS, OF NEW YORK, N. Y.

PASTEURIZING APPARATUS.

Application filed January 12, 1927. Serial No. 160,549.

This invention relates to Pasteurizing apparatus and more especially to an apparatus of the type disclosed in the patent to A. J. Davis No. 1,578,267 of March 30th, 1926. This apparatus comprises a plurality of annularly-arranged milk holders, each of which is provided with a water jacket. These holders are supported upon a frame which is rotatable about an axis centrally of the holders and in the central open space are arranged suitable pipes for circulating heated water through the jackets. The milk is Pasteurized by being maintained at a temperature of about 150° F. through the medium of the heated water circulated through the jackets and is held at such temperatures for approximately thirty minutes. During this treatment, the frame is rotated so that by the time the milk has been treated a sufficient length of time, the holder is in position to have the milk drained off. The holders have heretofore been open to the atmosphere so that a current of air may contact with the surface of the milk, thus cooling the surface below the Pasteurizing temperature so that the bacteria in the milk adjacent the surface may not be completely destroyed.

An object of this invention is to seal off the holders from the atmosphere, thereby preventing the circulation of air over the surface of the milk and ensuring that all of the milk is sufficiently heated to destroy the bacteria.

According to the invention, a stationary cover is provided for the apparatus and at its periphery there is provided a dependent flange, the lower end of which is arranged within a trough supported by the water jackets, which trough is partially filled with water. The cover is supported by a bridge extending across the top of the apparatus and having an aperture through which the water pipes extend. There is also provided a flange dependent from the bridge adjacent the aperture and its lower edge is arranged in a trough carried by the water jackets and also partially filled with water. The holders are thus sealed off from the atmosphere so that there can be no circulation of air over the surface of the milk. If desired, steam conduits may be provided between the cover and the milk holders, and preferably the covers are made of the several sections suitably hinged to the bridge so that access may be had to the holders without lifting the entire cover.

Other objects, novel features and advantages of the invention will be apparent from the following specification and accompanying drawings, wherein Figure 1 is a vertical section showing apparatus embodying the invention, and Fig. 2 is a plan view thereof.

A plurality of milk holders 10 are supported upon a platform 11 mounted upon a hollow shaft 12, the holders being symmetrically disposed around the axis of the shaft. Means similar to those described in detail in the aforementioned patent are provided for rotating the platform 11 and for supplying milk to be Pasteurized to said holders and for drawing off Pasteurized milk therefrom.

In order to maintain the milk in the holders 10 at the desired temperature, each of the holders is provided with a jacket 13 through which a heating fluid, such as hot water, may be circulated. Each jacket surrounds the sides and bottom of a holder 10, the heating liquid being preferably admitted to the jacket adjacent the bottom and inner end of the holder as shown at 14 and being drawn off from the jacket near the upper, outer portion of the holder, as shown at 15. The heating fluid is supplied through a pipe 16 to the shaft 12 and travels upwardly through the hollow interior thereof. The heating fluid is led from the shaft 12 through conduits 17 in the manner disclosed in the aforesaid patent to the jackets 13 and is conducted from the jackets through pipes 18 to a discharge pipe in the manner disclosed in said patent. With this arrangement the heating fluid may be circulated through the jackets during the rotation of the holders.

Across the top of the apparatus is provided a bridge 21 which is supported at its opposite ends by posts 22. This bridge is provided with a central aperture through which extend the circulation pipes for the heating fluid and the shaft 12. Surrounding the jackets 13 and supported thereby is a circular trough 23. A similar circular trough 24 is arranged in the inner space defined by the jackets 13 and is supported thereby. At either end of the bridge 21 and around the aperture through the bridge are provided dependent flanges extending into the troughs 23 and 24. A cover 25 is supported by the bridge 21 and preferably is made up in four sections, each section being independently hinged to one edge of the bridge. At the outer rim of each section is provided a curved dependent flange extending into the trough 23. Each cover section is provided with one or more radially projecting extensions 26 adapted to rest upon supports 27 properly to position the flanges in the trough 23. The troughs 23 and 24 are normally filled with water so that they form air-tight seals.

In each cover section is provided a relief valve 28 for permitting air to pass outwardly from under the cover and prevent flow of air from the outside into the space under the cover. Preferably, there is provided on the under surface of the cover a layer of heat insulating material 29, such, for example, as cork. Pipes 30 may be supported from the bridge and extend under the covers to which pipes steam may be supplied from a suitable source for heating the space between the cover and the milk holders. In one cover is provided an opening 31 through which milk may be supplied to the holders.

When milk is to be Pasteurized in this apparatus the two circular troughs are filled with water, thereby forming with the flanges an air-tight seal for the cover. Heating fluid is circulated through the jackets and the holders are caused to rotate about the shaft 12 in the manner described in the aforementioned patent. Circulation of air over the surface of the milk being Pasteurized is prevented and this air may be maintained at the Pasteurizing temperature by passing steam through the pipes 30. The entire body of the milk in each holder is thus maintained at the Pasteurizing temperature so that all the bacteria is destroyed.

I claim:

1. A milk-Pasteurizing apparatus comprising a plurality of holders rotatable about a common axis, a circular trough surrounding said holders, a second circular trough arranged interiorly of said holders, and a cover for said apparatus having depending flanges arranged in said troughs.

2. A milk-Pasteurizing apparatus comprising a plurality of holders rotatable about a common axis, a water jacket for each holder, means for circulating water through said jackets, a circular member carried by said water jackets and forming therewith a trough, and a cover having a peripheral flange depending into said trough.

3. A milk Pasteurizing apparatus comprising a plurality of holders rotatable about a common axis, a water jacket for each holder, means for circulating water therethrough, a pair of annular members supported by said water jackets and forming troughs therewith, and a cover for said apparatus, said cover having circular flanges depending into said troughs 4. A milk-Pasteurizing apparatus comprising a plurality of holders rotatable about a common axis, a water jacket for each holder, a bridge extending across the top of the apparatus and having an aperture, means passing through said aperture for circulating water through said jackets, a pair of annular members carried by said jackets and forming troughs therewith, a cover supported by said bridge and having a peripheral flange depending into one of said troughs, and a flange supported by said bridge and depending into the other of said troughs.

5. A milk-Pasteurizing apparatus comprising a plurality of holders rotatable about a common axis, a water jacket for each holder, a bridge extending across the top of the apparatus and having an aperture, means passing through said aperture for circulating water through said jackets, a pair of annular members carried by said jackets and forming troughs therewith, a plurality of cover sections pivoted to said bridge, each cover section having a peripheral flange depending into one of said troughs, a support associated with each of said cover sections, and a flange depending from said bridge into the other of said troughs.

6. A milk-Pasteurizing apparatus comprising a plurality of holders rotatable about a common axis, a circular trough surrounding said holders adjacent the top thereof, a cover for said apparatus having a peripheral flange depending into said trough, and heating means carried by said cover.

7. A milk-Pasteurizing apparatus comprising a plurality of holders rotatable about a common axis, a water jacket for each holder, means for circulating water through said jackets, a circular member carried by said water jackets and forming therewith a trough, a cover having a peripheral flange depending into said trough, and heating means carried by said cover.

8. A milk-Pasteurizing apparatus comprising a plurality of holders, a cover therefor, said cover and holders being mounted for rotation of one relative to the other, means for establishing an airtight seal between said cover and said holders, and heating means arranged between said cover and said holders.

9. A milk-Pasteurizing apparatus comprising a plurality of holders rotatable about a common axis, a circular trough surrounding said holders adjacent the top thereof, a cover for said apparatus having a peripheral flange depending into said trough, and heating means arranged between said cover and said holders.

10. A milk-Pasteurizing apparatus comprising a plurality of holders, a cover extending thereover, said cover and holders being mounted for rotation of one relative to the other, and heating means arranged between said cover and said holders.

11. A milk-Pasteurizing apparatus comprising a plurality of holders rotatable about a common axis, a cover extending thereover, means to rotate said holders relative to said cover, and heating means arranged between said cover and said holders.

In testimony whereof, I have signed my name to this specification.

ALBERT J. DAVIS.